US009969881B2

(12) United States Patent
Smink et al.

(10) Patent No.: US 9,969,881 B2
(45) Date of Patent: May 15, 2018

(54) PROCESS AND COMPOSITION FOR WELL-DISPERSED, HIGHLY LOADED COLOR MASTERBATCH (71) Applicant: Carolina Color Corporation, Salisbury, NC (US)

(72) Inventors: Jeffrey S. Smink, Rockwell, NC (US); Ronald M. Harris, Cumming, GA (US)

(73) Assignee: CAROLINA COLOR CORPORATION, Salisbury, NC (US)

( * ) Notice: Subject to any disclaimer, the term of this patent is extended or adjusted under 35 U.S.C. 154(b) by 426 days.

(21) Appl. No.: 14/334,710

(22) Filed: Jul. 18, 2014

(65) Prior Publication Data

US 2016/0017144 A1    Jan. 21, 2016

(51) Int. Cl.
*C08L 77/00*  (2006.01)
*C08L 23/14*  (2006.01)
*C08L 67/02*  (2006.01)
*C08L 33/12*  (2006.01)
*C08L 61/02*  (2006.01)
*C08L 81/06*  (2006.01)
*C08L 23/12*  (2006.01)
*C08L 23/08*  (2006.01)
*C08L 23/06*  (2006.01)
*C08L 71/00*  (2006.01)
*C08J 3/22*  (2006.01)
*C08L 23/02*  (2006.01)
*C08L 77/02*  (2006.01)
*C08L 77/06*  (2006.01)

(52) U.S. Cl.
CPC ............... *C08L 77/00* (2013.01); *C08J 3/22* (2013.01); *C08J 3/226* (2013.01); *C08L 23/02* (2013.01); *C08L 23/06* (2013.01); *C08L 23/08* (2013.01); *C08L 23/12* (2013.01); *C08L 23/14* (2013.01); *C08L 33/12* (2013.01); *C08L 61/02* (2013.01); *C08L 71/00* (2013.01); *C08L 81/06* (2013.01); *C08J 2323/00* (2013.01); *C08J 2409/06* (2013.01); *C08J 2423/06* (2013.01); *C08J 2425/12* (2013.01); *C08L 77/02* (2013.01); *C08L 77/06* (2013.01)

(58) Field of Classification Search
CPC .. C08J 3/20; C08L 77/00; C08L 61/02; C08L 67/02; C08L 33/12; C08L 81/06; C08L 23/14
USPC ........................................... 521/143; 523/351
See application file for complete search history.

(56) References Cited

U.S. PATENT DOCUMENTS

| 523,645 | A | * | 7/1894 | Jones ................... C04B 7/24 106/745 |
| 3,786,018 | A | * | 1/1974 | Nadler ................... C08J 3/2056 422/198 |
| 4,165,210 | A | | 8/1979 | Corbett |
| 4,409,165 | A | | 10/1983 | Kim |
| 4,446,090 | A | | 5/1984 | Lovgren et al. |
| 4,495,324 | A | | 1/1985 | Check et al. |
| 4,510,271 | A | | 4/1985 | Muhle et al. |
| 4,547,541 | A | | 10/1985 | Golba, Jr. |
| 4,759,939 | A | | 7/1988 | Keller et al. |
| 4,810,733 | A | | 3/1989 | Sakuma et al. |
| 4,877,568 | A | | 10/1989 | Austin |
| 4,880,653 | A | | 11/1989 | Keller et al. |
| 4,894,308 | A | | 1/1990 | Mahabadi et al. |
| 4,906,421 | A | | 3/1990 | Plamthottam et al. |
| 4,909,726 | A | | 3/1990 | Bekele |
| 4,949,628 | A | | 8/1990 | van Lengerich |
| 4,965,082 | A | | 10/1990 | Chawan et al. |
| 5,225,488 | A | | 7/1993 | Baird et al. |
| 5,316,578 | A | | 5/1994 | Buehler et al. |
| 5,376,702 | A | | 12/1994 | Stibal et al. |
| 5,420,198 | A | | 5/1995 | Papazoglou et al. |
| 5,480,923 | A | | 1/1996 | Schmid et al. |
| 5,486,327 | A | | 1/1996 | Bemis et al. |
| 5,531,923 | A | | 7/1996 | Le Blanc et al. |
| 5,604,279 | A | | 2/1997 | Bernhardt et al. |
| 5,621,040 | A | | 4/1997 | Akkapeddi et al. |
| 5,660,922 | A | | 8/1997 | Herridge et al. |
| 5,718,753 | A | | 2/1998 | Suzuki et al. |
| 5,723,520 | A | | 3/1998 | Akkapeddi et al. |
| 5,969,089 | A | | 10/1999 | Narayan et al. |
| 5,985,200 | A | * | 11/1999 | Vermilion ............... B29C 45/60 264/328.17 |
| 6,010,723 | A | | 1/2000 | Song et al. |
| 6,143,846 | A | | 11/2000 | Herrmann et al. |
| 6,150,442 | A | | 11/2000 | Chundury et al. |
| 6,242,127 | B1 | | 6/2001 | Paik et al. |
| 6,287,692 | B1 | | 9/2001 | Luo et al. |

(Continued)

FOREIGN PATENT DOCUMENTS

DE    10009752    9/2001
JP    11-106573    4/1999

(Continued)

OTHER PUBLICATIONS

Patent Abstracts of Japan, JP11-106573, Masterbatch, Mitsubishi Chemical Corp., Apr. 20, 1999.

(Continued)

*Primary Examiner* — Deve E Valdez
(74) *Attorney, Agent, or Firm* — McDonald Hopkins LLC (57) ABSTRACT A highly loaded and well-dispersed masterbatch composition and process for making thereof from a split stream process. The masterbatch composition includes a colorant, a thermoplastic carrier, a metallocene polymer processing aid, and optionally an additive. The split stream may be formed of a primary feed and a secondary feed. The primary and second feeds are combined by at least one of the following: supplying the secondary feed in either the same feed port as the primary feed, in a stream located upstream the primary feed, in a stream located downstream the primary feed, or a combination thereof.

25 Claims, 1 Drawing Sheet

(56) References Cited

U.S. PATENT DOCUMENTS

| | | |
|---|---|---|
| 6,316,547 B1 | 11/2001 | Varlet |
| 6,352,654 B1 | 3/2002 | Silvi et al. |
| 6,566,432 B2 | 5/2003 | Kawamura et al. |
| 6,649,666 B1 | 11/2003 | Read et al. |
| 6,713,598 B2 | 3/2004 | Selvaraj et al. |
| 6,773,499 B2 | 8/2004 | Schoen et al. |
| 6,776,596 B2 | 8/2004 | Brussel |
| 6,776,929 B2 | 8/2004 | Hossan et al. |
| 6,800,677 B2 | 10/2004 | Yakabe et al. |
| 6,812,274 B2 | 11/2004 | Deckers et al. |
| 6,951,900 B2 | 10/2005 | Blanchard et al. |
| 7,001,937 B2 | 2/2006 | Maki et al. |
| 7,087,668 B2 | 8/2006 | Hohner et al. |
| 7,148,314 B2 | 12/2006 | Gallucci et al. |
| 7,182,886 B2 | 2/2007 | Elkovitch et al. |
| 7,442,742 B1 | 10/2008 | Smink et al. |
| 7,488,764 B2 | 2/2009 | Hobbs et al. |
| 7,572,567 B2 | 8/2009 | Chung et al. |
| 7,829,640 B2 | 11/2010 | Barbieri et al. |
| 7,868,090 B2 | 1/2011 | Juikar et al. |
| 7,939,585 B2 | 5/2011 | Gaggar et al. |
| 8,148,466 B2 | 4/2012 | Wood et al. |
| 8,367,755 B2 | 2/2013 | Terada |
| 2004/0145077 A1* | 7/2004 | Fleischer ............ B01F 15/0404 264/211 |
| 2005/0121817 A1* | 6/2005 | Konig ...................... B29B 7/94 264/101 |
| 2008/0249211 A1* | 10/2008 | Smink ..................... C08J 3/226 523/351 |
| 2011/0073799 A1 | 3/2011 | Magni |
| 2011/0251303 A1* | 10/2011 | Rathschlag ........... C09C 1/0024 523/171 |

FOREIGN PATENT DOCUMENTS

| | | | |
|---|---|---|---|
| WO | WO00/37552 | | 6/2000 |
| WO | WO01/25331 | | 4/2001 |
| WO | WO2006/119904 | | 11/2006 |
| WO | WO2011/014528 | * | 2/2011 |

OTHER PUBLICATIONS

Sax, I., et al., "Master Batch," Hawley's Condensed Chemical Dictionary., 11th Ed., 1987, 734.

* cited by examiner

PROCESS AND COMPOSITION FOR WELL-DISPERSED, HIGHLY LOADED COLOR MASTERBATCH

TECHNICAL FIELD

The present disclosure relates in general to a process and composition for well-dispersed, highly loaded color masterbatch formulations from a split stream extrusion process, optionally including one or more additives. The highly loaded color masterbatch may contain one colorant or a formulated blend of colorants.

BACKGROUND

Colorants such as pigment preparations are often produced for masterbatches. A masterbatch is an encapsulated, pelletized, or granular, dust-free concentrate of a plastomeric or elastomeric polymer comprising a fraction of a colorant. Masterbatches are used to color plastics, being added to the plastic to be colored prior to or during processing. Masterbatches are used because they provide better colorant dispersion than neat colorants and eliminate dry colorant dust from the workplace.

A variety of processes for producing masterbatches are known and the following processes are standard in the production of the masterbatches: a) the mixing of a suitable matrix (polymers) with the colorant; b) dry blending/extrusion and kneading with subsequent grinding of the colorant concentrate; or c) dry blending/extrusion and subsequent fine spraying, hot chopping, or strand pelletizing. For example, as described in U.S. Pat. No. 7,442,742, a masterbatch composition is formed from dry blending/extrusion of a colorant, a thermoplastic carrier, a metallocene polymer processing aid, and optionally an additive. In comparison to U.S. Pat. No. 7,442,742, the present invention enables up to 20% or higher loadings of active ingredients.

Split stream feeding can be utilized in extrusion processing of plastics, food products, printing toners, latex, and other materials. Split stream feeding describes the use of two or more feed streams directed to processing in an extruder.

In the production of thermoplastic laminate structures, such as in U.S. Pat. No. 4,165,210, Corbett, August 1979, plastic laminated sheet structures are produced by the combination of two streams of molten plastic and that creates a laminar flow through a die yielding a laminar sheet or tube. In U.S. Pat. No. 4,909,726, Bekele, March 1990, a coextrusion process is described in which polymer streams from multiple extruders are combined at the die of one of the extruders to form a multilayer film. In U.S. Pat. No. 5,660,922, Herridge et al., August 1997, a coextrusion process for making tapes is described in detail.

With regard to downstream feeding of temperature sensitive components in plastics and food processing, U.S. Pat. No. 4,409,165, Kim, October 1983, describes how a temperature sensitive blowing agent is introduced as a separate feed downstream of the polymer feed at a point where the polymer is compacted but not yet molten, thereby reducing the temperature at which fusion takes place. In U.S. Pat. No. 6,649,666, Read et al., November 2003, another process is described in which a feed stream of a blowing agent is introduced separately from the polymer feed stream. In the extrusion processing of foods, water is often added as a separate feed stream, typically downstream to control evaporative losses, such as described in U.S. Pat. No. 4,759,939, Keller et al., July 1988, U.S. Pat. No. 4,880,653, Keller et al., and U.S. Pat. No. 4,949,628 van Lengerich, August 1990. U.S. Pat. No. 4,965,082, Chawan et al., October 1990, describes downstream feeding of liquid ingredients in pasta production.

In the art of downstream feeding of mechanically fragile materials, such as special effects pigments and functional fillers with high aspect ratio, U.S. Pat. No. 4,495,324, Chako et al., January 1985, describes feeding short glass fibers into an extruder downstream of the polymer pellet feed into the molten polymer to make a glass fiber reinforced composite. Additional examples of downstream feeding of mechanically fragile materials include U.S. Pat. No. 5,621,040, April 1997, U.S. Pat. No. 5,723,520, March 1998, Akapeddi et al., and U.S. Pat. No. 6,776,596, Brussel, August 2004, which describe feeding long glass fibers downstream into the polymer stream, post melting, to create a high strength glass reinforced composite. As described in U.S. Pat. No. 7,488,764, Hobbs et al., February 2009, high aspect ratios are encapsulated in microspheres which are subsequently fed at the primary feed port along with polymer pellets and also downstream of the pellets into the melt. U.S. Patent Application 2011/0073799, Magni et al., March 2011, describes composites produced by downstream feeding up to 35% high aspect ratio particles that enhance thermal conductivity of the polymer.

The downstream feeding of lubricants is described in U.S. Pat. No. 4,446,090, Lovgren et al., May 1984, U.S. Pat. No. 4,877,568, Austin, May 1988, and U.S. Pat. No. 5,531,923, Le Blanc et al., July 1996, which detail feeding liquid lubricants downstream of the polymer feed into the molten polymer. U.S. Pat. No. 5,486,327, Bemis et al., describes a similar process in which liquid color concentrates, which often contain oils, are introduced downstream of the polymer to extrude a colored plastic.

Whereas, downstream feeding of liquid components to adjust the viscosity of a material is described in U.S. Pat. No. 5,316,578, Buehler et al., May 1994, and U.S. Pat. No. 5,480,923, Schmid et al., January 1996, with regard to extrusion processing of starch products and the introduction of liquids downstream to reduce product viscosity in a controlled fashion.

The downstream feeding of particulate additives and fillers is described in patent literature with regard to particulate functional additives and fillers in the production of plastics materials. U.S. Pat. No. 4,906,421, Plamthottam, January 1990, describes downstream feeding of fillers, U.S. Pat. No. 5,969,089, October 1999, describes adding fillers and functional additives downstream of resins, and U.S. Pat. No. 6,242,127, June 2001, describes downstream addition of functional additives in a film extrusion process.

Downstream feeding of flame retardant additives is described in U.S. Pat. No. 6,713,598, Selvaraj et al., March 2004, U.S. Pat. No. 6,800,677, Yakobe, October 2004, which also includes downstream feeding of glass fibers for reinforcement, and U.S. Pat. No. 7,939,585, Gaggar et al., May 2011.

U.S. Pat. No. 6,287,692, Luo et al., September 2001, describes extrusion processing of wire and cable compounds in which particulate additives are introduced downstream of the polymer feed.

U.S. Pat. No. 8,367,755 describes polyphenylene ether thermoplastic compounds for sheet extrusion and molding in which additives are introduced downstream of the polymer feed during extrusion processing to make the compounds.

The use of split resin streams in the production of polymer alloys and blends via extrusion processing is described in U.S. Pat. No. 4,547,541, Golba, October 1985, U.S. Pat. No. 5,225,488, Baird et al., July 1993, U.S. Pat. No. 5,420,198, Papazoglou et al., May 1995, U.S. Pat. No. 7,182,886, Elkovitch et al., February 2007, U.S. Pat. No. 7,868,090, Ellul et al., January 2011, and U.S. Pat. No. 8,148,466, Wood et al., April, 2012.

Split stream feeding in reactive extrusion processes is known and described in U.S. Pat. No. 7,148,314, Gallucci et al., December 2006, which details feeding of a component with a desired functional group downstream of a polymer to then react with it and yield a functionalized polymer, and U.S. Pat. No. 7,829,640, Barbieri et al., November 2010, which details an extrusion reaction process in which the output stream is fed back to the feed throat for further reaction.

Adding a colorant feed downstream of the resin feed is described in U.S. Pat. No. 6,352,654, Silvy et al., March 2002, and U.S. Pat. No. 6,776,929, Hossen, August 2004, with regard to the production of an electrically conductive polymer via extrusion processing in which conductive carbon black powders or masterbatches are introduced downstream of the polymer feed into the melt.

Utilization extrusion processing in which a molten polymer is fed as a second feed stream has been described in U.S. Pat. No. 5,376,702, Stibel et al., December 1994, wherein a secondary polymer stream is split off, combined with other components, and then recombined with the primary polymer stream. In U.S. Pat. No. 6,010,723, Song et al., January 2000, a process is described for making chewing gum in which components of the recipe are compounded in a first extruder which then feeds its output to a second extruder into which are also fed components that will reduce the viscosity of the melt stream from extruder 1.

Extrusion compounding of a complex mixture of particulates, liquids, and resins in which a binder is fed downstream has been discussed in U.S. Pat. No. 4,894,308, Mahabadi et al., January 1990, wherein extrusion processing of electrostatic dry printing toners occurs by utilizing a dry blend of surfactants and pigments at the main feed port, which are melted under heat and pressure, and then conveyed past a second feed port where a polymer is introduced as a powder or pellets. U.S. Pat. No. 7,572,567, Chung et al., August 2009, describes a process in which an aqueous solution of poly Aluminum Chloride is introduced downstream as a coagulating binder into the melt stream of pigments and other components of an electrostatic toner for dry printing.

The described art is related to materials that were intended to be fabricated into parts or materials and methods for fabricating constructions. In contrast, the present invention relates to a process and materials for making an intermediate that is used to color thermoplastic materials; specifically, color and additive masterbatches.

In Stibel et al. (U.S. Pat. No. 5,376,702, December 1994), a separate molten polymer stream is combined with additives, and then recombined with a primary feed. In contrast, the present invention describes the counter-intuitive process of premelting the majority of the resin component of a masterbatch formulation which serves as the carrier or binder to increase the density to (i) create additional free volume in the feed throat for adding colorants and additives and (ii) start the pigment wetting process immediately upon contact with the resin.

Song et al. (U.S. Pat. No. 6,010,723, January 2000 and earlier patents) describes feeding the output of an extruder into the primary feed of a second extruder for the purpose of introducing viscosity reducing additives via the second extruder. Whereas, in the present invention, the majority of the resin component of a masterbatch formulation is pre-melted, and serves as the carrier or binder to densify the formulation to (i) create additional free volume in the feed throat for adding colorants and additives and (ii) begin the pigment wetting process immediately upon contact with the resin.

The invention also differs from Corbett, U.S. Pat. No. 4,165,210, August 1979, which describes the concept of bringing streams of molten plastic together in a die to form laminate structures. Similar differences exist between the current invention and the coextrusion processes described by Bekele, U.S. Pat. No. 4,909,726, March 1990, and Herridge et al., U.S. Pat. No. 5,660,922, August 1997.

The concept of adding pigments downstream of a resin feed is known. For example, U.S. Pat. No. 6,352,654, Silvy et al., March 2002, and U.S. Pat. No. 6,776,929, Hossen, August 2004, describe production of an electrically conductive polymer via extrusion processing in which conductive carbon black powders or masterbatches are introduced downstream of the polymer feed into the melt, where the carbon black is a minor component of the total composition. However, the invention relates to the downstream addition of pigments comprising up to 80% of the total composition.

Various patents describe downstream feeding of fillers, such as short glass fibers and composites with up to 70% glass fiber, which are commercially available. Colorants, however, have a much higher surface area to wet out, and as noted above, are dosed in as minor components downstream.

The prior art fails to describe introducing a pre-melted resin carrier feed downstream of the powder feed. Nor does it describe the concept of pre-melting the resin feed for the combined purposes of increasing the volume available for the powders to achieve higher loading than previously possible and initiating the wetting out process on contact. The invention described herein provides a volume enhancement in the primary feed in which the polymer melt feed and the colorant mix feed are introduced at the same primary feed throat. Furthermore, none of the patents described relate to the introduction of the polymer feed as a molten stream that is the output of a second melt processing unit, or relate to feeding the resin stream is upstream of the colorant mix feed. The methods cited in the prior art describe an extrusion process in which the resin is compressed and melted in the extruder prior to reaching the zone where the downstream feed port is located. However, as described in detail herein, there are advantages in pre-melting the resin in a separate device: (i) the compression, kneading, and melting zones of the primary extruder can be minimized; (ii) the process is more energy efficient in that more of the energy supplied to the extruder is used to affect incorporation and dispersion of the colorants and additives, enabling higher production rates, and (iii) a simple single screw extruder or melt pump can be used to pre-melt the polymer. Based on this, the total cost of the combined system can be lower than or comparable to that of the conventional extruder alone.

Known masterbatches formed from dry blending/extrusion are generally formulated using a method which includes a thermoplastic polymer, a colorant, a dispersant, and optionally one or more additives. The thermoplastic polymer is commonly referred to as a "carrier" or "carrier resin." A typical commercial formulation of a masterbatch, particularly formulated with a mixture of colorants (pigments and dyes) includes about 30% by weight of colorant, about 5% by weight of dispersant, about 10% by weight of additive, and about 55% by weight of a carrier.

Unfortunately, known masterbatches formed from dry blending/extrusion, particularly those comprised of blends of colorants (pigments and dyes) have a relatively low colorant concentration. Thus, it has been found that many known masterbatches introduce unnecessary costs and undesired amounts of auxiliary ingredients, such as carrier matrix. Particularly in the case of colorant formulations containing relatively high proportions of organic pigments, higher loadings of colorant cannot be used in known masterbatches produced from dry pigments due to insufficient dispersion. Insufficient dispersion of the colorant particles can lead to a decrease in physical and mechanical properties of the end product, such as tensile strength, flexural modulus, elongation, and impact strength. Also, pigment agglomerates can lead to surface imperfections that affect the part's appearance.

Organic pigment dispersion in conventionally produced masterbatches can be improved by using mostly or entirely powdered or finely granulated resins. However, this practice results in introducing dry blend mixtures of resin, colorants, and other ingredients having a significantly lower bulk density than mixtures with resin pellets. Less material is introduced into the extruder in any given time, resulting in a significant reduction in processing rate.

Another deficiency in known dry blending/extrusion masterbatch compositions is the inability to significantly improve the processability of the masterbatch itself and the end product.

Another deficiency in known dry blending/extrusion masterbatch processing is the blend volume limitation in the feed throat of an extruder. Fixed volume in the feed throat limits pigment and additive loadings, particularly in the case of organic pigments and certain effects pigments, such as pearlescent pigments, due to the low bulk density of these pigments. Similarly, these limitations on the amount of material introduced at the feed throat significantly reduce extrusion throughput and color strength.

Problems due to the fixed volume in the feed throat could be alleviated by increasing the free volume in the feed throat by using thinner flights, adding deeper roots on the screw, and extending the length of the opening; however, all of these attempts will only provide small incremental gains in the volume space (e.g., 10-15% more free volume space), do not provide the desired increase in pigment and additive loading, and sacrifice the strength and life of the screw.

Another deficiency in known dry blending/extrusion masterbatch compositions is the inability to include relatively significant amounts of loading with regard to additives such as ultraviolet light absorbers, light stabilizers, antioxidants, and blowing agents. Generally, additives are added only if desired and then in small amounts. Otherwise, it is believed that the processability of the masterbatch would be impaired.

In addition, other deficiencies in processing known dry blending/extrusion masterbatch compositions are inefficiencies of the work provided by the extruder and inefficiencies of the length of the extrusion cycle. Specifically, much of the energy and residence time is spent melting the polymer carrier instead of dispersing colorants.

Presently, there is no known system or method for providing a masterbatch composition that avoids the foregoing problems associated with conventional masterbatches. Accordingly, it is desirable to provide a masterbatch composition with improved processability that increases loading of the masterbatch composition as well as the coloration of the end product without sacrificing production rate, production throughput, physical and mechanical properties of the colored parts, and surface appearance, all the while introducing less carrier resin into the end part.

The present application, as described and claimed herein, addresses the above described deficiencies of prior art masterbatches and processes for developing the same.

SUMMARY

In one aspect, the present disclosure is directed to a process for making a masterbatch that includes mixing a colorant, an additive, a thermoplastic carrier, and optionally a metallocene polymer processing aid, and then adding a majority of the carrier resin in a molten state either to a port located at the primary feed, upstream the primary feed, downstream of the primary feed, or a combination thereof. While it is not uncommon to introduce additives and colorants as a separate stream in melt processing thermoplastics, generally downstream of the main feed, it is counterintuitive in conventional masterbatch processing to introduce the majority of the resin to a primary extruder as a melt stream generated by a secondary extruder or melt pump.

The present disclosure is directed to a masterbatch composition produced by using a split stream feed, which includes a main or primary feed having a colorant, a polymer processing aid, and optionally an additive and carrier resin, and a secondary feed including a majority of the carrier resin in a molten state either connected to the same feed as the primary feed, upstream the primary feed, downstream of the primary feed, or a combination thereof. The primary feed is largely composed of colorants, pigments, powdered resins, processing aids, and functional additives such as UV, AO, slip, antistats, anti-microbial, FR, etc. The primary feed may be a powder feed, a colorant mix feed, and/or a small granule feed.

In a further aspect, the present disclosure is directed to a process for making a colorized polymer that includes introducing a highly-loaded masterbatch composition to a melt-processable polymer to form a melt feed polymer composition, wherein the masterbatch comprises a colorant, a thermoplastic carrier, a metallocene polymer processing aid, and optionally an additive, and extruding the polymer composition to form the colorized polymer.

In an embodiment, a process for making a highly loaded and well-dispersed masterbatch composition from a split stream process comprises the following steps: a) mixing a colorant in a mixture in a primary feed; b) pre-melting a thermoplastic carrier in a secondary feed; and c) combining the mixture of the primary feed and the melted thermoplastic carrier of the secondary feed to form the masterbatch composition. Using the masterbatch composition from this process, a thermoplastic article may be produced.

In an embodiment, the mixing step includes an additive in the primary feed, the secondary feed, or a combination thereof.

In an embodiment, the mixing step includes a metallocene polymer processing aid in a primary feed, wherein the metallocene polymer processing aid is a polyolefin. The metallocene polymer processing aid may be an amorphous metallocene polypropylene copolymer obtained by polymerizing a propylene monomer with about 2-15% ethylene comonomer in the presence of a metallocene catalyst. Further, the metallocene polymer processing aid may exhibit a density of about 0.87-0.93 g/cm3, a drop point of about 80-145° C., and a viscosity of about 60-6300 mPas.

The combining step may further include supplying the secondary feed to a port located by the primary feed, upstream the primary feed, downstream the primary feed, or a combination thereof. The combining step may further include supplying an additive in the primary feed, the secondary feed, or a combination thereof.

An additive may be selected from the group consisting of antioxidants, ultraviolet light absorbers, light stabilizers, flame-retardants, antibacterial agents, surface tension reducers, deodorizing agents, anti-static agents, anti-blocking agents, plasticizer agents, fillers, and blowing agents.

The additive may further include an antioxidant of about 0-15% by weight, a light stabilizer about 0-45% by weight, and an ultraviolet light absorber about 0-45% by weight. In an embodiment, the additive is about 5-60% by weight.

The colorant may be about 15-80% by weight, the thermoplastic carrier is about 9-60% by weight, and the metallocene polymer is about 2-20% by weight. The colorant may be selected from the group consisting of organic pigment, inorganic pigment, single pigment dispersion, dye, coated mica, powdered aluminum, optical brightener, fluorescent, and phosphorescent. The colorant may include an organic pigment about 5-50% by weight. The colorant may include an organic pigment about 10-40% by weight. The colorant may include an inorganic pigment about 0-80% by weight. Further, the colorant may include an organic pigment about 3-40% by weight and an inorganic pigment about 10-60% by weight.

The thermoplastic carrier may be selected from at least one of the following: homopolymers and copolymers of polyethylene, polypropylene, polystyrene, polyoxymethylene, polyethylene terephthalate, polybutylene terephthalate, polymethyl methacrylate, polyether sulfones, polysulfones, polyether ketones, polystyrene copolymers, acrylonitrile-butadiene-styrene terpolymers, polyamides, polycarbonate, and combinations thereof.

The process may further include a dispersion package. In an embodiment, a dispersion package is selected from the group consisting of waxes, metal salts, coupling agents, and surfactants. The dispersion package may be about 2-8% by weight. The process may further include one of the following: flame-retardants, antibacterial agents, surface tension reducers, deodorizing agents, anti-static agents, anti-blocking agents, plasticizer agents, fillers, and blowing agents.

A process for making a highly loaded and well-dispersed masterbatch composition may further include the steps of: a) introducing a masterbatch composition formed from a split stream process, as provided in claim 1, to a melt-processible polymer to form a feed polymer composition, wherein the masterbatch composition comprises a pigment, a thermoplastic carrier, and, greater than 5% to about 60% by weight of an additive, wherein the additive is selected from the group consisting of antioxidants, ultraviolet light absorbers, and light stabilizers; and b) processing the polymer composition to form the masterbatch composition.

BRIEF DESCRIPTION OF THE DRAWINGS

The present disclosure may be better understood by reference to the following detailed description taken in connection with the following illustrations, wherein.

DETAILED DESCRIPTION

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings.

A masterbatch composition having a colorant and optionally one or more additives is provided. This disclosure describes the use of split stream feed processing equipment to make relatively highly loaded color concentrates and additives. The masterbatch composition of the present disclosure exhibits excellent colorant dispersability, coloring properties, increased additive concentrations, as well as improved handleability, so that the colored end product has excellent physical and mechanical strength as well as excellent coloration. The present masterbatch composition optionally includes a metallocene polymer processing aid that substantially eliminates many of the practical problems and limitations encountered in the current art. The optional metallocene polymer processing aid is compatible with various carrier resins, allows for decreasing the amount of conventional carrier resin, and also provides better mechanical and physical properties of the end products. The masterbatch split stream process allows for extraordinary increases in colorant loading compared to known processes. As the concentration of colorants and additives is increased, the amount of the masterbatch composition required to achieve the desired end product properties can be appreciably lower than conventional masterbatch compositions. In addition, the optional metallocene processing aid also improves the handleability of the masterbatch composition, as the masterbatch composition melts at lower temperatures that allow it to "wet out" or distribute more efficiently to provide better processability and increased throughput.

The masterbatch compositions generally include a colorant, a thermoplastic carrier, and optionally a metallocene processing aid and additives, such as antioxidants, ultraviolet light absorbers, and light stabilizers. In an embodiment, the metallocene polymer processing aid is an amorphous metallocene polypropylene copolymer obtained by polymerizing a propylene monomer with about 2-15%, about 2-10%, or about 5-10% ethylene comonomer in the presence of a metallocene catalyst. In an embodiment, the metallocene polymer processing aid exhibits a density of about 0.87-0.93 g/cm3, a drop point of about 80-145° C., and a viscosity of about 60-6300 mPas. In an embodiment, the metallocene polymer processing aid may have a range from amorphous to highly crystalline.

In an embodiment, the processing aid is a metallocene polymer which is a general term for a polymer in which metallocene is used as a catalyst for polymerization. The metallocene polymer processing aid is not a metallocene resin as is used in conventional masterbatches and has different structural and physical properties therefrom. This metallocene processing aid is a polymer having a higher monodispersibility and a narrower molecular weight distribution (for instance, Mw/Mn<2 in the case of metallocene polyethylene) than a polymer in which a conventional Ziegler catalyst, Ziegler-Natta catalyst, or the like is used. It has been found that the metallocene polymer processing aid allows a large amount of colorants to be evenly dispersed in the presence of a high additive concentration, giving the end product excellent coloration as well as better physical and mechanical properties. Accordingly, the composition can provide molded or extruded articles having excellent mechanical strength.

Accordingly, the metallocene polymer is a preferred processing aid because it has a low drop point, low viscosity, low density, and good wetting capability. The drop point of the polymer ranges preferably from 80° C. to 120° C. The viscosity of the polymer is preferably 60 to 6300 mPas. The density of the polymer is preferably 0.87 to 0.93 g/cm$^3$. The metallocene polymer may be present in the masterbatch composition up to about 20%, preferably from about 4% to about 12%. Suitable metallocene polymers include homopolymers of propylene or copolymers of propylene with one or more olefins or grafted with other polymers. Copolymers of propylene with ethylene are preferred. The ethylene content of the copolymers is from 0.1% to about 20%, preferably from about 2% to about 10%.

The metallocene polymer processing aid is highly compatible with various carrier resins. Illustrative examples of thermoplastic carriers are homopolymers or copolymers of high and low density polyethylene, high and low density polypropylene, polystyrene, polyoxymethylene, polyethylene terephthalate, polybutylene terephthalate, polymethyl methacrylate, polyether sulfones, polysulfones, polyether ketones, polystyrene copolymers, acrylonitrile-butadiene-styrene terpolymers, polyamides such as nylon-6 or nylon-6,6, polyvinyl chloride and copolymers of ethylene with 0.1-20 mol % of 1-butene, 1-pentene, 1-hexene, 4-methyl-1-pentene, 1-octene, 1-decene, 1-undecene, other impact modified alloys, or mixtures thereof. The polymer to be and the carrier polymer of the masterbatch can be, but do not have to be, the same.

Colorants added to the masterbatch may comprise pigments, single pigment dispersions, dyes, nano composites, coated micas, powdered aluminum and other metals, optical brighteners, fluorescents, phosphorescents, or mixtures thereof. Pigments may be at least one or a combination of organic pigments and inorganic pigments, and there is no particular limitation. When organic pigments are used, the organic pigments may be present up to about 50% by weight of the masterbatch composition. In a preferred embodiment, the organic pigments are present in a range from about 10 to about 40% by weight of the masterbatch composition. If inorganic pigments are used, the inorganic pigments may be present up to about 75% by weight of the masterbatch composition. In a preferred embodiment, the inorganic pigments are present in a range from about 15% to about 75% by weight of the masterbatch composition. In another embodiment, both organic and inorganic pigments are used, and the organic pigments may be present up to about 20% and the inorganic pigments may be present up to about 60%. In one embodiment, the organic pigment is present from about 3% to about 20% and the inorganic pigment is present from about 10% to about 60%.

Illustrative examples of the organic pigments include azo and disazo pigments such as azo and disazo lake, Hansas, benzimidazolones, diarylides, pyrazolones, yellows and reds; polycyclic pigments such as phthalocyanines, quinacridones, perylenes, perinones, dioxazines, anthraquinones, isoindolins, thioindigo, diaryl or quinophthalone pigment, Aniline Black, or mixtures thereof. Illustrative examples of the inorganic pigments include inorganic pigments such as titanium oxide, titanium yellow, iron oxide, ultramarine blue, cobalt blue, chromic oxide green, Lead Yellow, cadmium yellow and cadmium red, carbon black pigments, and mixtures thereof. The organic and inorganic pigments can be used singly or in combination. These pigments may be in any form of a dry powder, single pigment dispersions made conventionally or according to this process, or mixtures thereof.

In an embodiment, the colorant is about 15-80% by weight, the thermoplastic carrier is about 9-60% by weight, and the metallocene polymer is about 2-20% by weight. In another embodiment, the colorant is selected from the group consisting of organic pigment, inorganic pigment, single pigment dispersion, dye, coated mica, powdered aluminum, optical brightener, fluorescent, and phosphorescent. In yet another embodiment, the colorant comprises an organic pigment about 5-50% by weight. In an embodiment, the colorant comprises an organic pigment about 10-40% by weight. In an embodiment, the colorant comprises an inorganic pigment about 0-80% by weight. In an embodiment, the colorant comprises an organic pigment about 3-40% by weight and an inorganic pigment about 10-60% by weight.

Optionally, the masterbatch composition may also comprise an additive. Illustrative examples are ultraviolet light absorbers, light stabilizers, antioxidants, flame-retardants, antibacterial agents, surface tension reducers, deodorizing agents, anti-static agents, anti-blocking agents, plasticizer agents, blowing agents, fillers, and other known additives, or mixtures thereof.

Ultraviolet light absorbers (UVA) shield the polymer from UV light by absorbing light energy and releasing the absorbed light energy harmlessly as heat energy. Hindered amine light stabilizers (HALS) scavenge radical intermediates formed in the photo-oxidation process. The higher the concentration of UVA and/or HALS is, the greater the protection of the polymer (both the masterbatch carrier and the end product) from degradation and the color from fading may be. UVAs and HALS can be added up to about 45% by weight of the masterbatch. Preferred UVAs and HALS include those of the TINUVIN® grades from BASF SE. Illustrative examples of UVAs and HALS include salicylic acid derivatives such as phenyl salicylate, p-t-butyl salicylate, etc., benzophenone systems such as 2,4-dihydroxy benzophenone, 2-hydroxy-4-methoxybenzophenone, etc., benzotriazole systems such as 2-(2'-hydroxy-3',5'-di-t-butylphenyl)benzotriazole, 2-(2'-hydroxy-3'-t-butyl-5'-methylphenyl)-5-chlorobenzotriazole, etc., hindered amine systems such as bis(2,2,6,6-tetramethyl-4-piperidyl) sebacate, dimethyl succinate-1-(2-hydroxyethyl)-4-hydroxy-2,2,6,6-tetramethyl piperidine condensation product, 2-hydroxybenzophenones, e.g., 2,4-dihydroxybenzophenone, 2-hydroxy-4-methoxybenzophenone, 2-hydroxy-4-octoxybenzophenone, and 5,5'-methylene bis(2-hydroxy-4-methoxybenzophenone); 2-(2'-hydroxyphenyl) benzotriazoles, e.g., 2-(2'-hydroxy-5'-methylphenyl) benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-dicumylphenyl)benzotriazole, and 2,2'-methylene bis(4-t-octyl-6-benzotriazolyl)phenol; benzoates, e.g., phenylsalicylate, resorcinol monobenzoate, 2,4-di-t-butylphenyl-3',5'-di-t-butyl-4'-hydroxybenzoate, and hexadecyl-3,5-di-t-butyl-4-hydroxybenzoate; substituted oxanilides, e.g., 2-ethyl-2'-ethoxyoxanilide and 2-ethoxy-4'-dodecyloxanilide; cyanoacrylates, e.g., ethyl-alpha-cyanobeta, beta-diphenylacrylate and methyl-2-cyano-3-methyl-3-(p-methoxyphenyl)acrylate, and any other known UVAs, or mixtures thereof.

Additional illustrative examples of HALS include 2,2,6,6-tetramethyl-4-piperidylstearate, 1,2,2,6,6-pentamethyl-4-piperidylstearate, 2,2,6,6-tetramethyl-4-piperidylbenzoate, bis(2,2,6,6-tetramethyl-4-piperidylsebacate, bis(1,2,2,6,6-pentamethyl-4-piperidyl)sebacate, tetrakis(2,2,6,6-tetramethyl-4-piperidyl)-1,2,3,4-butane tetracarboxylate, tetrakis (1,2,2,6,6-pentamethyl-4-piperidyl)-1,2,3,4-butane tetracarboxylate, bis(1,2,2,6,6-pentamethyl-4-piperidyl)-di(tridecyl)-1,2,3,4-butane tetracarboxylate, bis(1,2,2,6,6-pentamethyl-4-piperidyl)-2-butyl-2-(3',5'-di-t-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino) hexane/dibromoethane polycondensate, 1,6-bis(2,2,6,6-tetramethyl-4-piperidylamino)hexane/2,4-dichloro-6-t-octy-1 amino-s-triazine polycondensate, 1,6-bis(2,2,6,6-tetramethyl-4-piperidylamino)hexane/2,4-dichloro-6-morpho-1 ino-s-triazine polycondensate, and the like, or mixtures thereof.

Antioxidants, including processing stabilizers, can be added to the masterbatch composition up to about 15% by weight of the masterbatch. Peroxide polymer degradation generally occurs during processing (e.g., due to heat or shear), or at the time of light exposure. Peroxide radicals may be formed during this period, which in turn may lead to the formation of hyperoxides. Antioxidants are incorporated into polymers to stabilize peroxide radicals to prevent degradation. Optimal polymer stability is achieved when the initial molecular weight and/or the initial color of the polymer is maintained. Therefore, the present masterbatch composition provides a higher degree of protection by achieving higher additive concentrations without sacrificing colorant concentrations. In one embodiment, both UVAs (and/or HALS) and an antioxidant may be added up to about 60% by weight of the masterbatch. It is preferred in such embodiments that the UVAs (and/or HALS) are added up to about 45% by weight of the masterbatch, and the antioxidant is added up to about 15% by weight of the masterbatch. Sterically hindered phenols or HALS are preferred antioxidants, particularly sterically hindered phenols of the Irganox® grades from BASF SE. Other illustrative examples of antioxidants include a phenol system such as 2,6-di-t-butyl-p-Cresol, pentaerythritol-tetrakis-(3,5-di-t-butyl-4-hydroxyphenyl) propionate methyl phenol, octadecyl-3-(3,5-di-t-butyl-4-hydroxyphenyl) propionate, etc., a phosphorus system such as tris(2,4-di-t-butylphenyl)phosphate, distearylpnetaerythritol diphophate, tetrakis(2,4-di-t-butylphenyl)-4,4'-biphenylene phosphonate, etc., a sulfur system such as distearyl-3,3'-thiodipropionate, pentaerythritol-tetrakis-(3-laurylthiopropionate), hindered phenol type antioxidants and peroxide decomposers, HALS (as set described above), or mixtures thereof.

Illustrative examples of hindered phenol type of antioxidants are 2,6-di-t-butyl-4-methylphenol, styrenated phenol, n-octadecyl-3-(3,5-di-t-butyl-4-hydroxylphenyl) propionate, 2,2'-methylene bis(4-methyl-6-t-butylphenol), 2-t-butyl-6-(3-t-butyl-2-hydroxy-5-methylbenzyl)-4-methylphenylacrylate, 2-[1-(2-hydroxy-3,5-di-t-pentylphenyl)ethyl]-4,6-di-t-pentylphenyl acrylate, 4,4'-butylidene bis(3-methyl-6-t-butylphenol), 4,4'-thio-bis(3-methyl-6-t-butylphenol), alkylated bisphenol, tetrakis[methylene-3-(3,5-di-t-butyl-4-hydroxyphenyl)-proprionate]methane, 3,9-bis[2-{3-(3-t-butyl-4-hydroxy-5-methylphenyl)-propionyloxy}-1,1-dimethylethyl]-2,4,8,10-tetraoxyspiro [5.5]undecane, or mixtures thereof.

Illustrative examples of peroxide decomposers are organic phosphorus type of peroxide decomposers, such as trisnonylphenylphosphite, triphenylphosphite, and tris(2,4-di-t-butylphenyl)phosphite; and organic thio type of peroxide decomposers, such as dilauryl-3,3'-thiodipropionate, dimyristyl-3,3'-thiodipropionate, distearyl-3,3'-thiodipropionate, pentaerythrityltetrakis(3-laurylthiopropionate), ditridecyl-3,3'-thiodipropionate, and 2-mercaptobenzimidazole, or mixtures thereof.

Illustrative examples of flame-retardants are phosphoric acid systems such as allyl diallyl phosphate, cresyl diphenyl phosphate, octyl diphenyl phosphate, triallyl phosphate, tributyl phosphate, triphenyl phosphate, tris(.beta.-chloroethyl)phosphate, tris(dichloropropyl)phosphate, tris(2,3-dibrompropyl)phosphate, tris(bromo-chloropropyl)phosphate, etc., chlorine system such as chlorinated paraffin, chlorinated polyphenyl, perchloropentacyclodecane, etc., bromine system such as tetrabromoethane, tetrabromobutane, hexaborombenzene, decabromodiphenyloxide, polydibrornophenyloxide, bis(tribromophenoxy)ethane, ethylene bisbromonorbornane dicarboxylmide, ethylene bistetrabromophthalimide, etc. reaction type such as chlorendic acid anhydride, tetrabromo phthalic anhydride, tetrabromo bisphenol A, dietoxy-bis-(2-hydroxyethyl)-aminomethyl phosphate, dibormcresyl alycidyl ether, etc., or mixtures thereof.

Illustrative examples of antibacterial agents include, phenol ether based antibacterial agents, such as those having the phenol group in the intramolecular skeleton, for example, 10,10'-oxybisphenoxa arsine, etc.; natural antibacterial agents, such as those having tropolone as a central skeleton, for example, hinokitiol, beta-dolabulin, etc., as glycerol ester of fatty acid, lower fatty acid monoglycerol ester, sucrose fatty acid ester, polyglycerol fatty acid ester, for example, monoglyceride caprylate, monoglyceride caprate, lauric acid monoglyceride, Sugar-ester palpitate, decaglycerol monocaprate, hexaglycerol caprylate, etc., zeolite-based compounds, part or whole of ion-exchangeable ion in zeolite-based compounds, for example, part or whole of sodium ion, calcium ion, potassium ion, magnesium ion, iron ion, etc. is substituted with ions with antibacterial property, such as silver ion, copper ion, zinc ion, ammonium ion, etc. can be exemplified. These compounds can be used singly or two or more kinds of them can be used in combination.

Fillers are typically inexpensive particulate materials that do not contribute to the color. Illustrative examples of fillers include, among others, talcs, micas, clays, nano-clays, silicas, or mixtures thereof.

The masterbatch composition described herein may contain other additives or ingredients and should not be limited to the stated formulations. In one embodiment, a dispersion package can be added to the masterbatch composition in an amount up to about 25% by weight of the masterbatch. In another embodiment, the dispersion package is added in an amount from about 2% to about 8% based on the weight of the masterbatch. The dispersion package can be waxes, metal salts, surfactants, coupling agents, organometallic compounds, and mixtures thereof. Illustrative examples include conventional polyethylene and polypropylene waxes and derivatives thereof such as acid-modified products and metal salts of acid-modified products, as well as zinc stearate, magnesium stearate, aluminum stearate, calcium stearate and ethylene bisteramide, and mixtures thereof.

Before actual mixing of the masterbatch, the components for each of the main feed and the secondary feed can be premixed if desired, for which drum or tumbler mixers may be used. In the actual dry blend mixing process, the mixing can be performed in a blade-type mixer. In one embodiment, the colorant blend is mixed in a high intensity mixer along with some wax until the wax melts and encapsulates the colorants, resulting in a well dispersed, densified colorant blend. Additional dispersion takes place in an extruder, for example a single-screw or twin-screw extruder, however, any suitable equipment known in the art may be used. Illustrative examples include Buss kneaders, planetary roll extruders, open double-trough kneaders, rapid stirrers, internal fluxing mixers such as Banbury mixers and Farrel continuous mixers, or the like.

In a main or primary feed the following are processed in a dry blend/extrusion configuration: a colorant, optionally an additive, a carrier resin, and a polymer processing aid. In one embodiment, the carrier resin in the primary feed may be present up to about 10% of the total formulation weight and can be blended in with the pigments and additives in the primary feed in a dry blend stage to assist with the pigment wetting out process. Alternatively, no carrier resin can be added to the primary feed.

Figure 1:
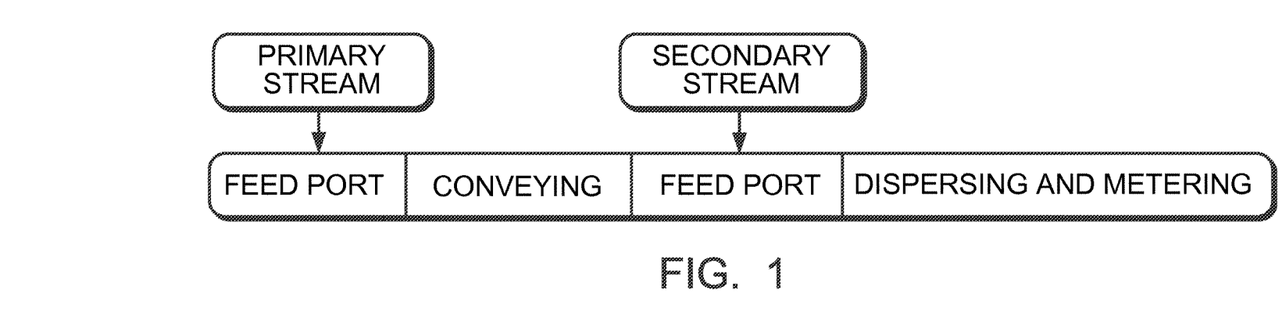
FIG. 1 is a process flow diagram for making a highly loaded and well-dispersed masterbatch composition from a split stream process in an embodiment.
Figure 2:
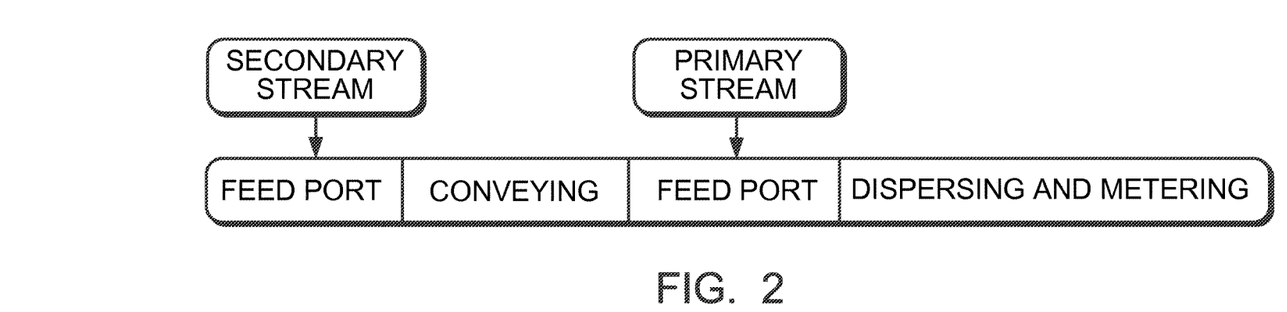
FIG. 2 is a process flow diagram for making a highly loaded and well-dispersed masterbatch composition from a split stream process in another embodiment.
Figure 3:
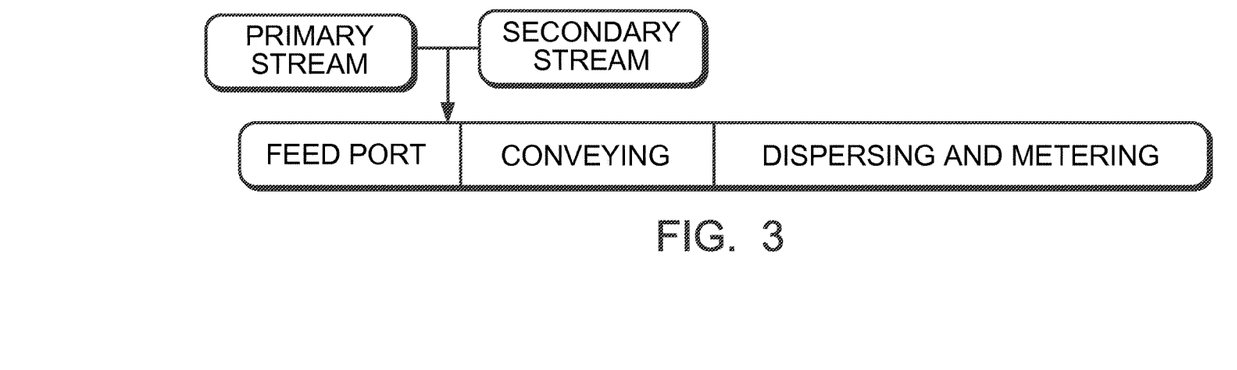
FIG. 3 is a process flow diagram for making a highly loaded and well-dispersed masterbatch composition from a split stream process in yet another embodiment.

The primary feed is in connection with a secondary feed at the primary feed port, upstream the primary feed port, downstream the primary feed port, or a combination thereof. As illustrated in FIG. 1, a process flow diagram is shown wherein the primary feed is upstream the secondary feed. In FIG. 2, the secondary feed is illustrated upstream the primary feed, and in FIG. 3, the primary feed and secondary feed are connected at the same feed port. The feed port, as illustrated in the Figures, may represent a meter, a valve, an opening, and any combination thereof. The conveying zone illustrates the conveyance of the materials to the melting, dispersing, and metering zones, which may include, but not limited to, kneading, compressing, reversing elements, etc.

In an embodiment, the secondary feed includes a majority of the carrier resin in a molten state. All or most of the carrier resin can be introduced to the masterbatch through the secondary feed. In alternative embodiments, the secondary feed is introduced in a molten state via a secondary feed port about 8 L/D upstream or downstream. The secondary feed may be produced by a relatively small secondary extruder, such as a low L/D single screw extruder, or a melt pump. In one embodiment, the secondary feed can be introduced by side feeding. In an embodiment, pre-melted resin carrier in the secondary feed stream has an increased melt flow compared to the low melt/high processed powder from the primary feed stream.

Introduction of the carrier resin from the secondary feed as a melt stream results in a higher density composition as compared to the bulk density of the pellets, flakes, or powder. Combination of the main/primary and secondary feeds allow for a higher volume of colorants and additives to be introduced via the primary feed. The secondary feed containing the molten carrier resin begins to wet out the pigment immediately upon contact with the mixture from the main stream.

Use of a secondary feed provides benefits from maintenance and cleaning perspectives, as the corresponding secondary extruder or melt pump requires a changeover only when the resin is altered or changed, such that merely a simple purge with the next resin is needed. Based on this, the addition of a carrier stream in the secondary feed saves time and money with regard to maintenance and cleaning of at least the secondary feed extruder/melt pump.

An additional benefit of using a secondary feed includes having additional room for active ingredients to be processed in the extruder and wetted out with molten polymer, which takes up less free volume in the extruder than the pellet form. This allows for processing an increased loading of low bulk density ingredients.

Furthermore, use of a secondary feed, whether it is concurrent with, upstream, or downstream the primary feed, will increase the efficiency of the work that the extruder can provide by filling flights with low bulk density ingredients with low temperature melting metallocene polymer and dispersing aids that will wet out early and add density to the powder ingredients, so that once the molten resin is introduced in its most dense state, the flights of the extruder are full of a masterbatch, as opposed to being partially full (e.g., ¼ or ½), such as those of conventional masterbatch extrusion processes. Filling flights allows for an increase of work and pressure within the extruder, which facilitates dispersion and high throughput rates. Correspondingly, another advantage of utility of a secondary feed is that the length of the extrusion time can be shortened because the resin does not need to be melted and there is increased efficiency of utilizing full flights. Use of a secondary feed allows for many benefits without sacrificing production rates.

In an embodiment, the secondary feed is processed as a continuous process operated via a single screw or continuous mixer. In another embodiment, the secondary feed is processed in a batch process.

Furthermore, the secondary feed may be processed by use of a gentle screw configuration with minimal mixing, yet maintain a masterbatch composition with high loadings. In an embodiment, the secondary feed is paired with a gentle screw configuration, a dispersive screw with mostly kneaders, a single screw extruder, or a twin-screw extruder.

In another embodiment, a primary feed and a secondary feed may be introduced at a first feed throat and yet maintain a masterbatch formulation with at least 50% inorganic pigment loading.

In exemplary embodiments, as shown below in Tables 1, 2, 3, and 4, a set of trials for Red (Red Formulation for Polyolefins), Green (Green Formulation for Polyolefins), Purple (Purple Pearl Formulation for Polyolefins), and Yellow (Yellow Formulation for Polyolefins) pigmented masterbatch compositions are formulated from the split stream process described herein and compared to a conventional masterbatch formulation developed from a dry blend/extrusion process as shown below. The components of the color feed stream are dry blended and then introduced upstream of the molten resin feed stream.

As referred to herein, the G2® Formula is developed according to U.S. Pat. No. 7,442,742, wherein G2 is a registered trademark owned by Carolina Color Corporation located in Salisbury, N.C.

TABLE 1

Red Formulation for Polyolefins

| Component | G2 Formula % of Total | 60:40 Split % of Total | 65:35 Split % of Total | 70:30 Split % of Total | 75:25 Split % of Total |
|---|---|---|---|---|---|
| Pigment Red 122 | 11.86 | 13.47 | 14.59 | 15.72 | 16.84 |
| Pigment Red 101 | 4.14 | 4.70 | 5.09 | 5.49 | 5.87 |
| Pigment Red 170 | 12.65 | 14.37 | 15.57 | 16.77 | 17.96 |

TABLE 1-continued

Red Formulation for Polyolefins

| Component | G2 Formula % of Total | 60:40 Split % of Total | 65:35 Split % of Total | 70:30 Split % of Total | 75:25 Split % of Total |
|---|---|---|---|---|---|
| Polymer Processing Aid | 5.00 | 4.73 | 5.13 | 5.52 | 5.91 |
| Dispersion Aid | 3.00 | 3.78 | 4.10 | 4.42 | 4.73 |
| PE Flake | 20.00 | 18.92 | 20.50 | 22.08 | 23.65 |
| PE Pellets | 43.33 | 40.00 | 35.00 | 30.00 | 25.00 |
| Pigment Loading v. Standard | 100% | 114% | 123% | 132% | 142% |

Table 1 illustrates the pigment loading for a Red Formulation for Polyolefins of various masterbatch compositions formed from a split stream, wherein the ratio of the primary feed to the secondary feed is 60:40, 65:35, 70:30, or 75:25 by weight. As the ratio of the primary feed to secondary feed increases, the loading of pigment also increases. As shown in Table 1, a 75:25 split results in a higher bulk density of red pigment of approximately 42% higher loading than the G2 Formula.

TABLE 2

Green Formulation for Polyolefins

| Component | G2 Formula % of Total | 60:40 Split % of Total | 65:35 Split % of Total | 70:30 Split % of Total | 75:25 Split % of Total | 80:20 Split % of Total |
|---|---|---|---|---|---|---|
| Pigment Yellow 194 | 5.09 | 5.65 | 6.13 | 6.60 | 7.07 | 7.54 |
| Pigment Green 17 | 16.30 | 18.11 | 19.61 | 21.12 | 22.63 | 24.14 |
| Pigment Green 7 | 18.28 | 20.30 | 22.00 | 23.69 | 25.38 | 27.07 |
| Pigment Black 7 | 0.35 | 0.39 | 0.42 | 0.46 | 0.49 | 0.52 |
| Dispersion Aid | 4.00 | 4.44 | 4.81 | 5.18 | 5.55 | 5.92 |
| Polymer Processing Aid | 7.00 | 6.48 | 7.02 | 7.56 | 8.10 | 8.64 |
| PE Flake | 5.00 | 4.63 | 5.01 | 5.40 | 5.78 | 6.17 |
| PE Pellets | 43.97 | 40.00 | 35.00 | 30.00 | 25.00 | 20.00 |
| Pigment Loading v. Standard | 100% | 111% | 120% | 130% | 139% | 148% |

Table 2 illustrates the pigment loading for a Green Formulation for Polyolefins of various masterbatch compositions formed from a split stream, wherein the ratio of the primary feed to the secondary feed is 60:40, 65:35, 70:30, 75:25, or 80:20 by weight. Similar to the above described Table 1, as the ratio of the primary feed to secondary feed increases, the loading of pigment also increases. As shown in Table 2, an 80:20 split results in a higher bulk density of green pigment of approximately 48% higher loading than the G2 Formula.

In exemplary embodiments, as shown below in Tables 3 and 4, a set of trials for Purple (Purple Pearl Formulation for Polyolefins) and Yellow (Yellow Formulation for Polyolefins) pigmented masterbatch compositions are formulated from the split stream process described herein and compared to a conventional masterbatch formulation developed from a dry blend/extrusion process.

TABLE 3

Purple Pearl Formulation for Polyolefins

| Component | G2 Formula % of Total | 65:35 Split % of Total | 80:20 Split % of Total |
|---|---|---|---|
| Violet Satin Pearl | 5.90 | 6.85 | 8.44 |
| Violet Sparkle Pearl | 5.90 | 6.85 | 8.44 |
| Red Satin Pearl | 4.72 | 5.49 | 6.75 |
| Pigment Blue 29 | 9.44 | 10.97 | 13.51 |

TABLE 3-continued

Purple Pearl Formulation for Polyolefins

| Component | G2 Formula % of Total | 65:35 Split % of Total | 80:20 Split % of Total |
|---|---|---|---|
| Pigment Red 122 | 1.13 | 1.32 | 1.62 |
| Polymer Processing Aid | 4.00 | 4.64 | 5.72 |
| Dispersion Aid | 4.50 | 4.99 | 5.79 |
| Mineral Oil | 2.00 | 2.32 | 2.86 |
| Slip Agent | 13.34 | 15.49 | 19.07 |
| PP Flake | 5.00 | 5.81 | 7.15 |
| PP Pellets | 44.06 | 35.00 | 20.00 |
| Pigment Loading v. Standard | 100% | 112% | 142% |

Table 3 illustrates the pigment loading for a Purple Pearl Formulation for Polyolefins of various masterbatch compositions formed from a split stream, wherein the ratio of the primary feed to the secondary feed is 65:35 or 80:20 by weight. Similar to the above described Tables 1 and 2, as the ratio of the primary feed to secondary feed increases, the loading of pigment also increases. As shown in Table 3, an 80:20 split results in a higher bulk density of purple pigment of approximately 42% higher loading than the G2 Formula.

The blend containing an 80:20 split includes approximately 58% active ingredients (e.g., pigments and slip agent), including approximately 19% slip agent. Due to the reduced L/D for the primary extruder there is a brighter appearance and less reduction of particle size for the Purple Pearl compared to the G2 Formula as run on a conventional masterbatching twin-screw.

TABLE 4

Yellow Formulation for Polyolefins

| Component | G2 Formula % of Total | 60:40 Split % of Total | 70:30 Split % of Total |
|---|---|---|---|
| Pigment White 6 | 0.55 | 1.18 | 1.38 |
| Pigment Yellow 109 | 5.51 | 11.77 | 13.73 |
| Pigment 110 | 5.51 | 11.77 | 13.73 |
| Solvent Yellow 33 | 4.41 | 9.41 | 10.99 |
| Dispersion Aid | 2.10 | 4.48 | 5.23 |
| SAN Powder | 10.00 | 21.38 | 24.94 |
| ABS Pellets | 71.93 | 40.00 | 30.00 |
| Pigment Loading v. Standard | 100% | 212% | 248% |

Table 4 illustrates the pigment loading for a Yellow Formulation for Polyolefins of various masterbatch compositions formed from a split stream, wherein the ratio of the primary feed to the secondary feed is 60:40 or 70:30 by weight. Similar to the above described Tables 1, 2, and 3, as the ratio of the primary feed to secondary feed increases, the loading of pigment also increases. As shown in Table 4, a 70:30 split results in a higher bulk density of yellow pigment of approximately 48% higher loading than the G2 Formula.

The blend containing a 70:30 split includes over approximately 27% hard to disperse organic pigments, in addition to approximately 11% dye.

Each of the ratios described in Tables 3 and 4 has been verified by ash tests and by molding plaques.

The masterbatch may be introduced to any compatible polymer and processed. It is understood that the masterbatch composition of the present disclosure can be used for coloring polymers formed into various shapes, such as sheet, film, tube, bottles, containers, molded products and other molded articles. The term processing is used herein to describe the conversion of polymers into articles of a desired shape. Illustrative examples of processing are extrusion molding, injection molding, blow molding, compression molding, and calendering. The addition of the masterbatch to the melt-processable polymer can be accomplished by any means known in the art. It is possible to use the same methods as for preparing the masterbatch itself. It is understood that the masterbatch carrier polymer can be the same as or different from the melt-processable polymer. The masterbatch composition may be introduced and processed via a batch or continuous process. In one illustrative embodiment, the masterbatch may be introduced to the melt-processable polymer and processed on a rubber compounding mill, simple kneader, or in a Banbury or other internal mixer, or in a mixing extruder. Alternatively, the masterbatch can be metered to the feed section of an extruder by appropriate devices. Continuous processes can be carried out, for example, in rapid mixers, single-screw extruders, twin-screw extruders, Buss kneaders, planetary roll extruders, open double-trough kneaders, or rapid stirrers. Continuous processes are preferred.

Although the embodiments of the present teachings have been described in the accompanying embodiments and in the foregoing detailed description, it is to be understood that the present teachings are not to be limited to just the embodiments disclosed, but that the teachings described herein are capable of numerous rearrangements, modifications and substitutions.

What is claimed is:

1. A process for making a masterbatch composition from a split stream process comprising the steps of:
    a) mixing a colorant in a mixture in a primary feed;
    b) pre-melting a thermoplastic carrier in a secondary feed;
    c) combining the mixture of the primary feed and the melted thermoplastic carrier of the secondary feed at a ratio (by weight) of primary feed to secondary feed between 60:40 and 80:20 to form a highly loaded masterbatch composition having up to 80% by weight of colorant.

2. The process of claim 1, wherein the mixing step includes an additive in the primary feed, the secondary feed, or a combination thereof.

3. The process of claim 1, wherein the mixing step includes a metallocene polymer processing aid in the primary feed, wherein the metallocene polymer processing aid is a polyolefin.

4. The process of claim 1, wherein the metallocene polymer processing aid is an amorphous metallocene polypropylene copolymer obtained by polymerizing a propylene monomer with an ethylene comonomer in the presence of a metallocene catalyst.

5. The process of claim 1, wherein the metallocene polymer processing aid exhibits a density of about 0.87-0.93 g/cm$^3$, a drop point of about 80-145° C., and a viscosity of about 60-6300 mPas.

6. The process of claim 1, wherein the combining step includes supplying the secondary feed to a port located at the primary feed, upstream the primary feed, downstream the primary feed, or a combination thereof.

7. The process of claim 1, wherein the combining step includes an additive in the primary feed, the secondary feed, or a combination thereof.

8. The process of claim 7, wherein the additive is selected from the group consisting of antioxidants, ultraviolet light absorbers, light stabilizers, flame-retardants, antibacterial agents, surface tension reducers, deodorizing agents, anti-static agents, anti-blocking agents, plasticizer agents, fillers, and blowing agents.

9. The process of claim 7, wherein the additive is about 5-60% by weight.

10. The process of claim 7, wherein the additive comprises at least one selected from: an antioxidant, a light stabilizer, and an ultraviolet light absorber, and wherein the antioxidant is provided at about 0-15% by weight, the light stabilizer is provided at about 0-45% by weight, and the ultraviolet light absorber is provided at about 0-45% by weight.

11. The process of claim 1, wherein the colorant is about 15-80% by weight and the thermoplastic carrier is about 9-60% by weight, and wherein the mixing step includes adding a metallocene polymer in the primary feed at about 2-20% by weight.

12. The process of claim 1, wherein the colorant is selected from the group consisting of organic pigment, inorganic pigment, single pigment dispersion, dye, coated mica, powdered aluminum, optical brightener, fluorescent, and phosphorescent.

13. The process of claim 1, wherein the colorant comprises an organic pigment about 5-50% by weight.

14. The process of claim 1, wherein the colorant comprises an inorganic pigment about 0-80% by weight.

15. The process of claim 1, wherein the colorant comprises an organic pigment about 3-40% by weight and an inorganic pigment about 10-60% by weight.

16. The process of claim 1, wherein the thermoplastic carrier is selected from at least one of the following: homopolymers and copolymers of polyethylene, polypropylene, polystyrene, polyoxymethylene, polyethylene terephthalate, polybutylene terephthalate, polymethyl methacrylate, polyether sulfones, polysulfones, polyether ketones, polystyrene copolymers, acrylonitrile-butadiene-styrene terpolymers, polyamides, polycarbonate, and combinations thereof.

17. The process of claim 1, further comprising a dispersion package.

18. The process of claim 17, wherein a dispersion package is selected from the group consisting of waxes, metal salts, coupling agents, and surfactants.

19. The process of claim 17, wherein the dispersion package is about 2-8% by weight.

20. The process of claim 1, further comprising at least one of the following: flame-retardants, antibacterial agents, surface tension reducers, deodorizing agents, anti-static agents, anti-blocking agents, plasticizer agents, fillers, and blowing agents.

21. A process for making a second masterbatch composition comprising the steps of: a) introducing the masterbatch composition of claim 1 to a melt-processible polymer to form a feed polymer composition, wherein the masterbatch composition further comprises greater than 5% to about 60% by weight of an additive, wherein the additive is selected from the group consisting of antioxidants, ultraviolet light absorbers, light stabilizers, and combinations thereof; and b) processing the feed polymer composition to form the second masterbatch composition.

22. A thermoplastic article produced using the masterbatch composition formed from the process of claim 1.

23. A thermoplastic article produced using the masterbatch composition formed from the process of claim 1.

24. The process of claim 1, wherein the combining step includes providing the mixture of the primary feed and the melted thermoplastic carrier of the secondary feed at a ratio (by weight) of primary feed to secondary feed selected from 65:35; 70:30; and 75:25.

25. The process of claim 1, wherein the combining step includes forming the masterbatch composition into any one of: an encapsulated concentrate, a pelletized concentrate, and a granular, dust-free concentrate.

* * * * *